US008408982B2

(12) United States Patent
Marty et al.

(10) Patent No.: US 8,408,982 B2
(45) Date of Patent: Apr. 2, 2013

(54) METHOD AND APPARATUS FOR VIDEO GAME SIMULATIONS USING MOTION CAPTURE

(75) Inventors: Alan W. Marty, Menlo Park, CA (US); John Carter, Elkmont, AL (US)

(73) Assignee: Pillar Vision, Inc., Menlo Park, CA (US)

( * ) Notice: Subject to any disclaimer, the term of this patent is extended or adjusted under 35 U.S.C. 154(b) by 0 days.

(21) Appl. No.: 13/561,260

(22) Filed: Jul. 30, 2012

(65) Prior Publication Data

US 2012/0289296 A1 Nov. 15, 2012

Related U.S. Application Data

(63) Continuation-in-part of application No. 12/127,744, filed on May 27, 2008.

(60) Provisional application No. 60/931,950, filed on May 24, 2007, provisional application No. 61/524,236, filed on Aug. 16, 2011.

(51) Int. Cl.
*A63F 7/06* (2006.01)

(52) U.S. Cl. .................... 463/2; 463/3; 463/7

(58) Field of Classification Search .............. 463/2, 3, 463/7, 36, 37
See application file for complete search history.

(56) References Cited

U.S. PATENT DOCUMENTS

| | | | |
|---|---|---|---|
| 420,788 A | 2/1890 | Hart | |
| 4,160,942 A | 7/1979 | Lynch et al. | |
| 4,337,049 A | 6/1982 | Connelly | |
| 4,545,576 A | 10/1985 | Harris | |
| 4,565,527 A | 1/1986 | Burchett | |
| 4,893,182 A | 1/1990 | Gautraud et al. | |
| 5,039,977 A | 8/1991 | Mele et al. | |
| 5,138,322 A | 8/1992 | Nuttall | |
| 5,210,603 A | 5/1993 | Sabin | |
| 5,342,041 A | 8/1994 | Agulnek et al. | |
| 5,342,051 A | 8/1994 | Rankin et al. | |
| 5,365,247 A | 11/1994 | Van der Veen et al. | |
| 5,365,427 A | 11/1994 | Soignet et al. | |
| 5,398,936 A | 3/1995 | Kluttz et al. | |

(Continued)

FOREIGN PATENT DOCUMENTS

| | | |
|---|---|---|
| EP | 0 704 715 | 9/1995 |
| FR | 2 710 434 | 9/1993 |

(Continued)

OTHER PUBLICATIONS

Silverberg et al., "Numerical Analysis of the Basketball Shot," Journal of Dynamic Systems, Measurement and Control, Dec. 2003, vol. 125, pp. 531-540.

(Continued)

*Primary Examiner* — Dmitry Suhol
*Assistant Examiner* — Jay Trent Liddle
(74) *Attorney, Agent, or Firm* — Kwan & Olynick LLP

(57) ABSTRACT

A method in a video gaming system including a processor, a memory and a sensor system for capturing body motion is described. In one embodiment, the body motion can be associated with a person pretending to hit or launch an object, such as an object used in a sporting activity. In general, body motion can be associated with any activity involving similar body motions that are repeated during the activity. In a video game generated by the video gaming system, a consistency with which the repeated body motions are made over time can be used to determine an outcome for a single instance of the body motion. In a particular embodiment, a probability of a more desirable outcome resulting from the single instance of the body motion can increase as the consistency with which the repeated body motions are made increases.

29 Claims, 5 Drawing Sheets

U.S. PATENT DOCUMENTS

| | | | |
|---|---|---|---|
| 5,413,345 A | 5/1995 | Nauck | |
| 5,489,099 A | 2/1996 | Rankin et al. | |
| 5,542,988 A | 8/1996 | Bogus | |
| 5,697,791 A | 12/1997 | Nashner et al. | |
| 5,768,151 A | 6/1998 | Lowy et al. | |
| 6,093,923 A | 7/2000 | Vock et al. | |
| 6,095,928 A | 8/2000 | Goszyk | |
| 6,133,946 A | 10/2000 | Cavallaro | |
| 6,179,720 B1 | 1/2001 | Rankin et al. | |
| 6,289,167 B1 | 9/2001 | Boetje et al. | |
| 6,304,665 B1 | 10/2001 | Cavallaro et al. | |
| 6,389,368 B1 | 5/2002 | Hampton | |
| 6,396,041 B1 | 5/2002 | Vock et al. | |
| 6,430,997 B1 | 8/2002 | French et al. | |
| 6,500,073 B1 | 12/2002 | Gobush et al. | |
| 6,539,336 B1 | 3/2003 | Vock et al. | |
| 6,567,116 B1 | 5/2003 | Aman et al. | |
| 6,569,336 B1 | 5/2003 | Mouchet et al. | |
| 6,707,487 B1 | 3/2004 | Aman et al. | |
| 6,774,345 B1 | 8/2004 | Kenk | |
| 6,774,349 B2 | 8/2004 | Vock et al. | |
| 6,778,866 B1* | 8/2004 | Bettwy | 700/56 |
| 6,816,185 B2 | 11/2004 | Harmath | |
| 6,839,771 B1 | 1/2005 | Bouchier et al. | |
| 7,094,164 B2 | 8/2006 | Marty et al. | |
| 7,658,676 B2* | 2/2010 | Ohta | 463/37 |
| 7,850,552 B2* | 12/2010 | Marty et al. | 473/467 |
| 7,854,669 B2* | 12/2010 | Marty et al. | 473/467 |
| 2002/0119841 A1 | 8/2002 | Foley | |
| 2004/0155962 A1* | 8/2004 | Marks | 348/169 |
| 2007/0026974 A1 | 2/2007 | Marty et al. | |
| 2007/0026975 A1 | 2/2007 | Marty et al. | |
| 2008/0268943 A1* | 10/2008 | Jacob | 463/23 |
| 2010/0267443 A1* | 10/2010 | Shimamura et al. | 463/23 |
| 2012/0142416 A1* | 6/2012 | Joutras | 463/36 |
| 2012/0172126 A1* | 7/2012 | Padovani et al. | 463/36 |
| 2012/0214594 A1* | 8/2012 | Kirovski et al. | 463/36 |
| 2012/0225719 A1* | 9/2012 | Nowozin et al. | 463/36 |
| 2012/0258804 A1* | 10/2012 | Ahmed | 463/39 |

FOREIGN PATENT DOCUMENTS

| | | |
|---|---|---|
| WO | WO 98/24242 | 6/1998 |
| WO | WO 01/54781 | 2/2001 |
| WO | WO 01/38898 | 5/2001 |

OTHER PUBLICATIONS

Tran, "Optimal release conditions for the free throw in men's basketball," Journal of Sports Sciences, Sep. 2008; 26(11): 1147-1155.

Okubo et al., "Dynamics of basketball-rim interactions," Sports Engineering, (2004) 7, pp. 15-29.

Okubo et al., "Effects of basketball free throw release conditions using a dynamic model," The Engineering of Sport 5, vol. 1, 372-378, Central Plain Book Mfg., 2004.

Okubo et al., "Dynamics of basketball-rim interactions," The Engineering of Sport: 4, Blackwell Science, Oxford, 2002, pp. 660-666.

Okubo et al., "Strategies for Bank Shots and Direct Shots in Basketball," The Engineering of Sport: 6, vol. 3, Springer, New York, 2006, pp. 233-248.

Okubo et al., "Dynamics of the basketball shot with application to the free throw," Journal of Sports Sciences, Dec. 2006; 24(12): 1303-1314.

Hawk-Eye-Wikipedia, the free encyclopedia http://en.wikipedia.org/wiki/Hawk-Eye, printed Jan. 10, 2008, pp. 1-4.

* cited by examiner

METHOD AND APPARATUS FOR VIDEO GAME SIMULATIONS USING MOTION CAPTURE

CROSS REFERENCE TO RELATED APPLICATIONS

The present application is a continuation-in-part and claims priority to i) U.S. patent application Ser. No. 12/127,744, entitled "STEREOSCOPIC IMAGE CAPTURE WITH PERFORMANCE OUTCOME PREDICTION IN SPORTING ENVIRONMENTS," filed May 27, 2008, which claims priority to U.S. Provisional Application No. 60/931,950, entitled "STEREOSCOPIC IMAGE CAPTURE WITH PERFORMANCE OUTCOME PREDICTION IN SPORTING ENVIRONMENTS," filed May 24, 2007, and ii) U.S. Provisional Application No. 61/524,236, entitled, "MOBILE NATURAL MOTION CAPTURE DEVICE AND APPLICATION TO VIDEO GAMES," filed Aug. 16, 2011, the contents of each of which are hereby incorporated by reference in their entirety and for all purposes.

FIELD OF THE INVENTION

The present invention is generally related to methods and apparatus for video gaming systems. More particularly, the present invention is related to methods and apparatus for video gaming systems including motion capture.

BACKGROUND OF THE INVENTION

Participating in sporting activities, such as golf, tennis, soccer, basketball and football, and playing video game simulations of these sporting activities are both popular pastimes. Currently, beyond sharing the same set of rules, the actual participation in sporting activity is quite different than playing a video gaming simulation of the sporting activity. For example, the skills needed to actually hit a golf ball are quite different than the skills needed to play a video game simulation in golf.

In recent years, video gaming systems, such as a Wii™ by Nintendo and the Xbox™ with a Kinect™ sensor by Microsoft have been introduced that include motion sensing capabilities. The video gaming systems and their sensing capabilities have allowed user motions to be used as an input mechanism for playing video games. For example, instead of hitting a button to hit a golf ball in a golf video game, using these new systems, a user can move their body in some manner to hit the golf ball where how they move their body can affect the input used for the video game and hence the golf shot shown in the video game.

One reason sports video game simulations are popular is because of their relationship to the actual activity. Although the new video game systems now allow for limited user motions while the video game is played, the relationship between the motions made while playing video games and while playing the actual sports activity is at best superficial. In view of the above, new methods and apparatus for are desired using motion sensing capabilities for playing video games.

SUMMARY OF THE INVENTION

A method in a video gaming system including a processor, a memory and a sensor system for capturing body motion is described. In one embodiment, the body motion can be associated with a person pretending to hit or launch an object, such as an object used in a sporting activity. The method can be generally said to include: 1) receiving in the processor a motion consistency parameter where the motion consistency parameter is generated from data captured during a plurality of different instances of the person attempting to repeat the body motion and where a determining of the motion consistency parameter includes determining a position of at least one point on a body of the person during each of the plurality of different instances of the body motion and determining a standard deviation using the determined positions; 2) capturing via the sensor system data for a single instance of the person attempting to repeat the body motion while pretending to hit or launch the object; 3) based upon the data from the single instance, in the processor, predicting a magnitude of a force and a direction of the force that would be imparted to the object if it was actually hit or launched wherein physical properties of the object including its size and mass are simulated; 4) determining whether the magnitude of the estimated force and the direction of the force are within acceptable ranges for a valid body motion associated with the person pretending to hit or launch the object; 5) when the magnitude of the estimated force and the direction of the estimated force are determined to be within the acceptable ranges, determining in the processor whether a desired outcome for the simulated object is possible; 6) when the desired outcome is determined to be possible, determining in the processor whether the desired outcome or a non-desired outcome has occurred wherein a probability of the desired outcome occurring increases as the standard deviation associated with the motion consistency parameter decreases; and 7) rendering in the processor to a display a simulated trajectory of the simulated object for the single instance, wherein the rendered simulated trajectory shows the determined desired outcome or the determined non-desired outcome occurring for the simulated object.

In general, body motion can be associated with any activity involving similar body motions that are repeated during the activity. In a video game generated by the video consistency, a consistency with which the repeated body motions are made over time can be used to determine an outcome for a single instance of the body motion. In a particular embodiment, a probability of a more desirable outcome resulting from the single instance of the body motion can increase as the consistency with which the repeated body motions are made increases.

As an example, in a boxing game, a person may repeatedly strike out with their arm to simulate a punch or raise their arm to simulate a block. A motion consistency parameter can be generated from data captured during a plurality of different instances of the person attempting to repeat the punching or the blocking body motions. Then, the motion consistency parameter can be used to determine an outcome of a single instance of a body motion including a punch or block, such as whether the punch lands or misses and whether the block is successful or not. In particular, the motion consistency parameter can affect a probability of the punch landing or the block being successful, such as increasing or decreasing the probability depending on its value.

In particular embodiments, the object the person is pretending to hit or launch is a ball. The ball can be one of a basketball, tennis ball, volleyball, golf ball, baseball, soccer ball, bowling ball or a football. As an example, the person can be pretending to shoot a basketball where the desired outcome is a made shot and the non-desired outcome is a missed shot in a video game generated by the video gaming system.

In other embodiments, the desired outcome can be the simulated object stopping within a defined area and the non-desired outcome can be the simulated object stopping outside of a defined area in a video game generated by the video gaming system. In one example, the video game can be a golf video game and the desired outcome is one of a simulated golf ball coming to rest at an optimal distance in a fairway or on a green and the non-desired outcome is one of the simulated golf coming to rest off the fairway, off the green or at a non-optimal distance on the fairway or the green. The desired outcome can also be the simulated object passing through a defined area and the non-desired outcome is the simulated object passing outside of the defined area in a video game generated by the video gaming system. For example, the video game can be a soccer video game where the defined area is a plane of the goal. The desired outcome can be the soccer ball passing through the plane of the goal and the non-desired outcome is the soccer ball passing outside the plane of the goal.

DETAILED DESCRIPTION

Figure 1A:
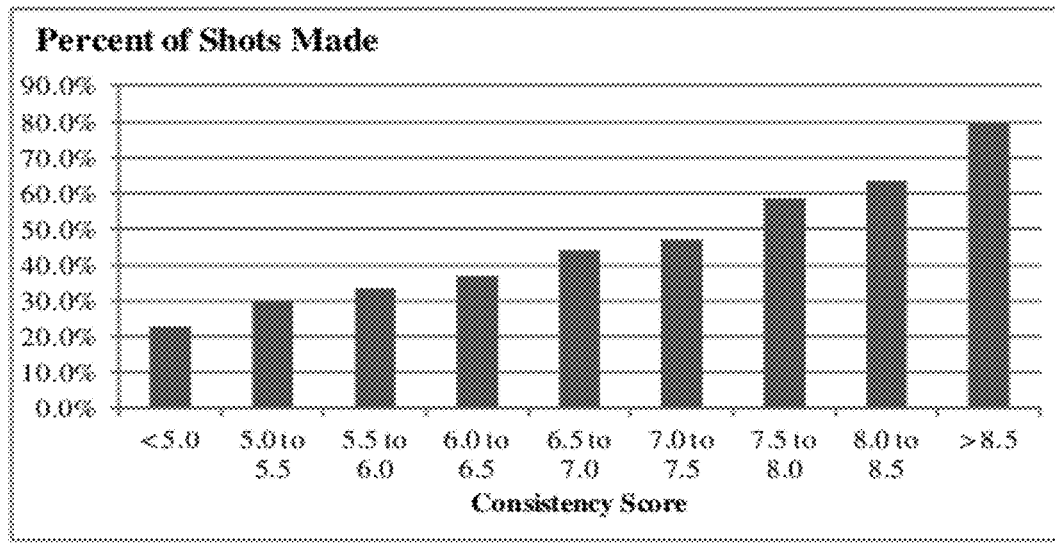
FIG. 1A is a bar graph of a percentage of basketball shots made versus consistency score in accordance with an embodiment of the present invention.

In the following paper, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

Typically in sports, certain motions are repeated again and again as part of playing the game where the motions are relatively similar from instance to instance. For example, in basketball, a player shoots a basketball, such as free throw, or takes other shots where a somewhat similar shooting motion is repeated for each shot. In baseball, a pitcher throws a baseball to the catcher and a batter swings a bat, where the throwing or swinging motions are similar for each throw or swing. In golf, a player swings different clubs or putts to hit a golf ball, where the swinging motion for each swing or putt is somewhat similar. In tennis, a player serves the tennis ball or chooses from a number of different strokes to hit the tennis ball. There are similarities in the serving motion from serve to serve or in the stroke motions for each type of stroke.

In football, a quarterback throws the football or a kicker kicks the football, where the throwing motions or kicking motions are similar for many of the throws or kicks. In soccer, a player kicks the ball, where many of the kicks and the kicking motions are similar. For example, for each instance of a corner kick, the kicking motion can be similar from kick to kick. In volley ball, a player serves, sets or spikes the volleyball, where there can be similarities between different instances of these motions.

In each of the sports above, under a variety of conditions a player is trying to control a placement of an object, such as a ball. The placement of the object can involve controlling the trajectory of the object so that it travels through some bounded area or arrives within some volume of space at a desired time. For example, for a field goal kicker, the objective is for the ball to pass through area between the goal posts along its trajectory. As another example, for a quarterback or a soccer player, it is desirable to place the ball in a particular volume of space at the same time another player is entering the space. In yet another example, a hockey player tries to place the puck through a plane in front of net not blocked by a goalie.

The control of the placement of the object can also involve attempting to control the final resting point of the object after it has been hit or launched. For example, in golf, it may be desirable to place the golf ball in a fairway as opposed to the rough. As another example, it may be desirable to hit the ball so that it lands on the green as opposed to a hazard around the green, such as the rough, a water hazard or a bunker.

Many of these situations are repeated and the objective of the player each time the situation occurs is to perform an action with their bodies that achieves the desired outcome. Generally, the player strives to reproduce the same motion each time. However, because of the limits of the human body, as any person that has watched professional basketball players shooting free throws can attest, the ability to reproduce the same motion each time within the range of accuracy needed for a particular sport is easier said than done. Nevertheless, the process of overcoming the difficulties associated with repeatedly moving one's body in a particular way to allow success in a sport is what makes the sport interesting to most individuals.

For all these sports, many theories have been developed in regards to what makes a particular player skilled, what optimal techniques to use and how any player can develop these skills. Typically, the theories are developed by looking at a few individuals that are deemed successful in their sport, determining what motions they make and then specifying training techniques that allow another individual to mimic the motions. The success of this approach is limited because when it comes to controlling errors associated with body motions every individual is different. Thus, the techniques that work for one skilled individual don't apply to every individual and it is difficult to determine for each individual what techniques to utilize.

What has not been done in the past is a rigorous analysis in sports, such as but not limited to basketball, of how a consistency of an individual's ability to repeat body motions associated with the sport is related to their skill level where the analysis is based upon data measured from a large number of individuals with a wide range of skill levels and body types. Thus, with respect to FIGS. 1A, 1B and 2, an analysis of skill level as related to a reproducibility of body motions for basketball, where a large number of players with varying skill levels are considered, is discussed. One observation from the analysis is that players that are most consistent in making the same shooting motion from shot to shot also make the highest percentage of their shots. As will be discussed in more detail below, this observation seems to be independent of technique.

As is described with respect to FIGS. 3, 4A, 4B, 5 and 6, a method for video game simulations that utilizes this observation about consistency of body motion is described. In particular embodiments, the method is utilized in video gaming systems including body motion detection capabilities, such a Xbox360™ system from Microsoft™ with a Kinect™ sensor. The method can be configured to utilize body motion data captured from a single instance of a body motion associated with pretending to hit or launch an object in a sports video game and the consistency at which the body motion has been repeated from a number of previous different instances to determine the outcome resulting from the single instance of the body motion in the sports video game.

As an example, in a basketball video game, an individual can make the body motion of pretending to shoot a free throw. A sensor system associated with the video gaming system can capture aspects of the shooting motion. Based upon data derived from the captured free throw motion and the consistency with which the individual has been able to reproduce the shooting motion based upon a number of different previously captured measurements of the person making the shooting motion, a prediction can be made in regards to the outcome of the most recently captured shooting motion, such as whether the free throw is made or missed. Once the outcome to the free throw is determined, a video animation of the shooting motion can be rendered and output to a display. The video animation can include an individual shooting and the basketball travelling a trajectory that shows the determined outcome. As described above and in accordance with actual shooting data, the method can proscribe that individuals more able to consistently reproduce a similar shooting motion will on average make more shots in the video game as compared to individuals that are less consistent at reproducing their shooting motions.

Motion Consistency as a Performance Predictor

In this section, motion consistency as a performance predictor is described. In particular, shooting motions related to basketball and the observation that individuals whose shooting motions vary less from shot to shot tend to make a higher percentage of their shots is discussed. For basketball, the motion consistency can be the consistency of the shooting motion from shot to shot and the performance predictor may be the percentage of shots made. Other body motions and performance predictors associated with sporting activities other than basketball can be analyzed and the example of the shooting motion in basketball is provided for the purposes of illustration only.

The consistency observations for basketball are based upon an analysis of a large amount of data gathered from individuals actually shooting baskets and a mechanical device constructed to shoot baskets and mimic the variations in shooting motions which are exhibited by individuals. Details of the mechanical shooting device and other factors related to predicting performance are described in U.S. application Ser. No. 12/127,744, previously incorporated herein. Some details of the experimental data are described as follows.

Figure 1B:
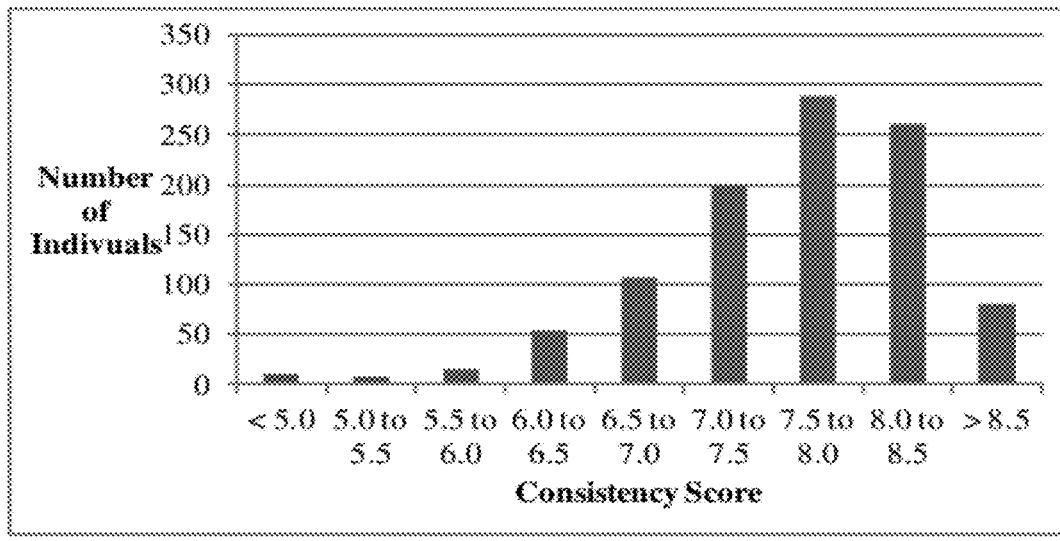
FIG. 1B is a bar graph of numbers of players with consistency scores in various ranges as determined from basketball data in accordance with an embodiment of the present invention.

FIG. 1A is a bar graph of a percentage of basketball shots made versus consistency score and FIG. 1B is a bar graph of numbers of players with consistency scores in various ranges as determined from basketball data. To generate the figures, data was gathered from around a thousand different individuals shooting basketball free throws. On the order of at least 10 shots were measured for each player. Thus, the data set includes measurements from more than 10,000 shots.

Video images of a shot basketball travelling along its trajectory were captured for the different individuals and their different shots. The trajectories of the shot basketballs for each individual were characterized using the video data. One example of a system that can be used to characterize the trajectories is the Noah™ select system by Pillar Vision, Inc. (Athens, Ala.). Some details related to characterization of trajectories of objects in various sporting environments are described in U.S. Pat. Nos. 7,094,164, 7,850,552, 7,854,669 and U.S. patent application Ser. Nos. 11/972,553, 12/015, 445, 12/127,744, 12/966,301 each of which is incorporated by reference and for all purposes.

In the examples of FIGS. 1A and 1B, an entry angle of the basketball as it approaches the basketball hoop and a location that the center of the ball crosses the plane in of the hoop are characterized for each shot by each individual. Variations in these parameters reflect variations in shooting motions of the individual from shot to shot. If the individual shoots the ball with the exact same shooting motion each time, then from a given shot location, such as the free throw line, the entry angle and the location that the center of the ball crosses the plane of the hoop would be the same each time.

Based upon the shooting data analyzed for each individual, a consistency score was generated. The consistency score is one example of a consistency parameter that can be used to characterize a consistency of body motion that is repeated during an activity, such as a sporting activity. The consistency score for a number of shots can configured as a function of i) the entry angle, standard deviation and ii) a distance, standard deviation. The distance used in the standard deviation can be the location where the center of the ball crosses the plane of the hoop. The minimum value of the standard deviation of the entry angle or the standard deviation of the distance is zero.

In statistics and probability theory, standard deviation (represented by the symbol $\sigma$) shows how much variation or "dispersion" exists from the average (mean, or expected value). A low standard deviation indicates that the data points tend to be very close to the mean, whereas high standard deviation indicates that the data points are spread out over a large range of values. Other examples of measures that can be used to characterize an amount of variation in a data set and which can be applied to generate a consistency parameter are a range and a variance.

The consistency score can be configured to have a maximum value of 10. The maximum value of 10 can be generated for a shot data set where the entry angle for each shot and the location that the center of the ball crosses the plane of the hoop are the same for each shot. For such a data set, the standard deviation of the entry angle and the standard deviation of where the ball crosses the plane of the hoop are both zero. Hence, the consistency score is ten.

When the entry angle and the location that the center of the ball crosses the hoop plane are the same for two trajectories, it doesn't necessarily mean that the two trajectories are exactly the same. It only means that these two values derived from the trajectory analysis of each trajectory are the same. Additional or other trajectory parameters can be derived and can be used to characterize a trajectory of an object with more refinement if desired.

For a group of trajectories, these two parameters provide a reasonably representation of how consistent each of the trajectories are in the group and hence how consistent the body motions were that generated the trajectories. However, as will be described in more detail below, other parameters can be used to characterize the consistency of body motions over a number of repeated attempts. For example, the motion of the body, such as the motion of a hand or an elbow during a basketball shot, can be measured directly and motion consistency parameters can be derived from these measurements.

The direct measurement of a body motion can be used in lieu of or in combination with a measurement of a trajectory of an object launched or hit as a result of the body motion. For example, a first motion consistency parameter can be defined which utilizes a standard deviation associated with measured trajectories of objects launched or hit as a result of the body motion and which utilizes one or more standard deviations associated with measurements at one or more points on the body while the individual hits or launches objects. A second motion consistency parameter can be defined which only utilizes one or more standard deviations associated with measurements at one or more points on the body while the individual launches or hits objects.

The second motion consistency parameter can be used for characterizing a consistency of motions when objects, such as a ball, are not launched or hit. For example, the individual might pretend to hit or launch a ball a number of times and the consistency of these motions can be characterized. As another example, the individual might make motions associated throwing a punch or making a kick and the consistency of these motions can be characterized.

Returning to the example of basketball, in FIG. 1A an average shooting percentage for a free throw for individuals with consistency scores in various ranges are shown. In FIG. 1B, an amount of individuals in each consistency score range are shown. As shown in the FIG. 1A, the average percent of shots made increases as the consistency score increases. As described above, the consistency score provides a reasonable measure of an individual's consistency at making their shooting motion i.e., have less variability in their shooting motion from shot to shot. Thus, it can be concluded that individuals that are more consistent in making their shooting motion make a higher percentage of their shots and hence can be considered more skilled shooters.

Although not shown, factors related to technique were considered. For example, it has been found that some arcs are more optimal for making a shot than other shots. Thus, individuals that shoot a ball with a more optimal arc increase their chances of making a shot. However, from the data represented in FIGS. 1A and 1B, individuals were grouped that shot the ball on average with a similar arc. When the individuals were grouped in this manner, it was still found that individuals with a higher consistency score made a higher percentage of their shots as compared to individuals with a lower consistency score. Other effects associated with technique were also considered and again, the relationship that individuals with a higher consistency score made a higher percentage of their shots still held.

From these results, it was concluded that independent of technique, individuals that are more consistent at making their shooting motion such that their variations in their body motions from shot to shot are lower as compared to other individuals can be said to be more skilled than individuals that are less consistent in making their shooting motions. The greater shooting percentage of individuals with a more consistent shooting motion backs this skill level conclusion. In general, for many different activities involving a repeated body motion, it is believed that independent of technique, individuals that are more consistent at making a repeated body motion such that their variations over each of the instances of the body motions are lower as compared to other individuals, can be said to be more skilled at the activity than individuals that are less consistent at making their repeated body motions.

As will be discussed in more detail as follows, these conclusions are applied to develop a family of video games that use a characterization of the consistency of repeated body motions to affect a prediction of an outcome resulting from a single instance of the body motion. These video games may be played on video gaming systems including the capability to capture body motions. An Xbox-type video gaming system from Microsoft™ with a Kinect™ sensor is one example of system on which the video games can be played.

A few examples of how these motion capture capabilities can be utilized in a video game are described as follows. In a basketball video game, a measured consistency of a shooting motion of a person pretending to shoot a ball can be used to affect a prediction of whether one instance of the person pretending to shoot the ball will be made or missed. The determined outcome can be rendered as part of the video game. In a golf video game, a measured consistency of a person pretending to swing a club many different times can be used to affect a prediction of whether one instance of the person pretending to swing the club results in a desirable shot or a non-desirable shot, such as on the fairway or in the rough. In a fighting video game, a measured consistency at which a person makes a punch or a kick over many different instances can be used to affect a prediction of whether one instance of a punch or a kick hits or misses an opponent in the video game. It is believed that these types of games will be more enjoyable than existing video games because improvements in consistency of body motion in games involving motion capture will result in better outcomes in video games in the same way that improvements in consistency of body motion result in better outcomes in actual sporting activities as illustrated above with respect to the example of basketball.

Outcome Prediction

As described above, a measure of consistency of a motion can be used to affect a prediction of an outcome resulting from one instance of the motion in a context of a video game. Thus, prior to discussing detail of a method for video games in FIG. 3, a few details of outcome prediction are discussed with respect to FIG. 2. In particular, a few details related to outcome prediction for basketball are described as follows.

Figure 2:
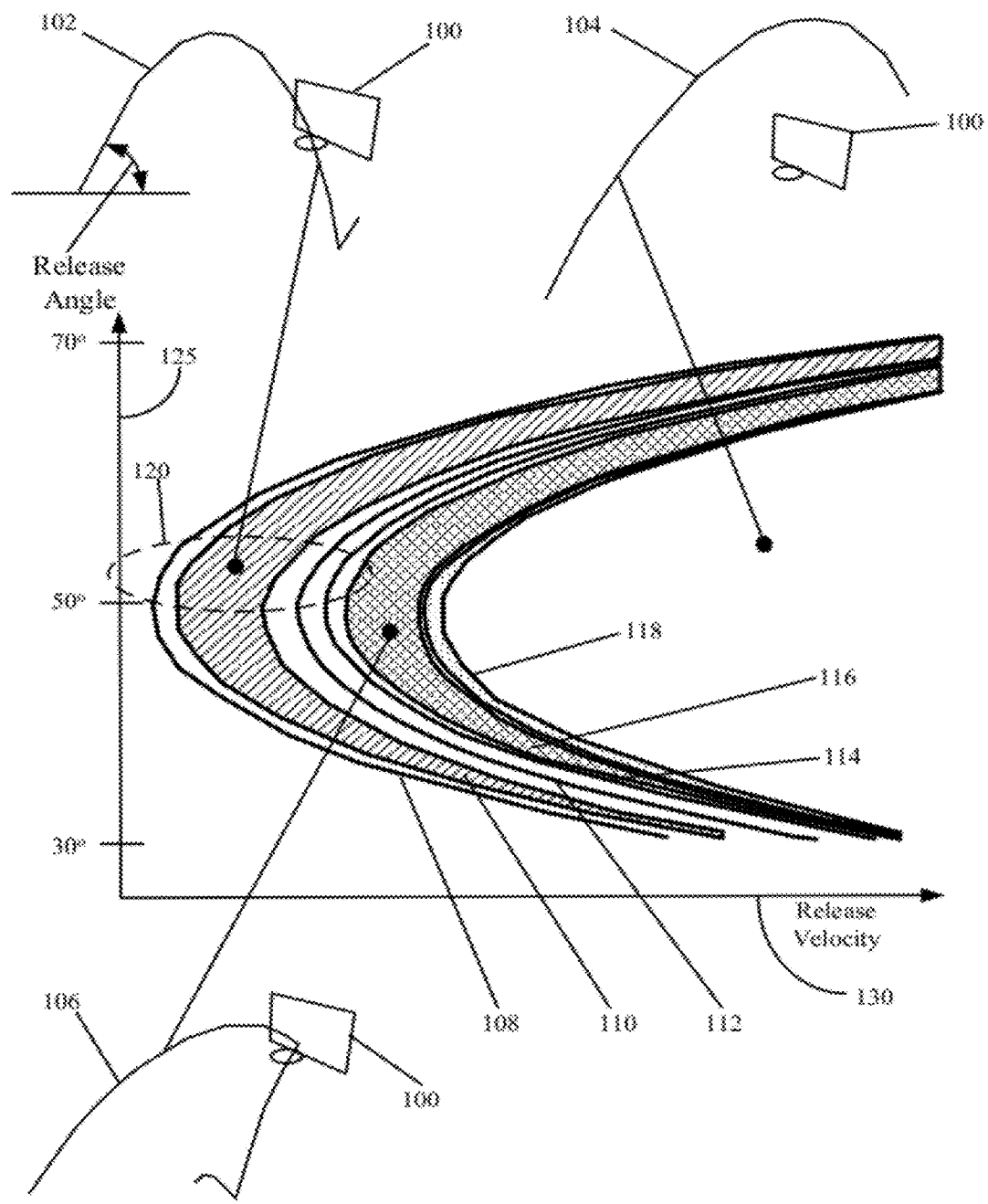
FIG. 2 is a chart illustrating the effects of release velocity versus release angle for basketball in accordance with an embodiment of the present invention.
Figure 3:
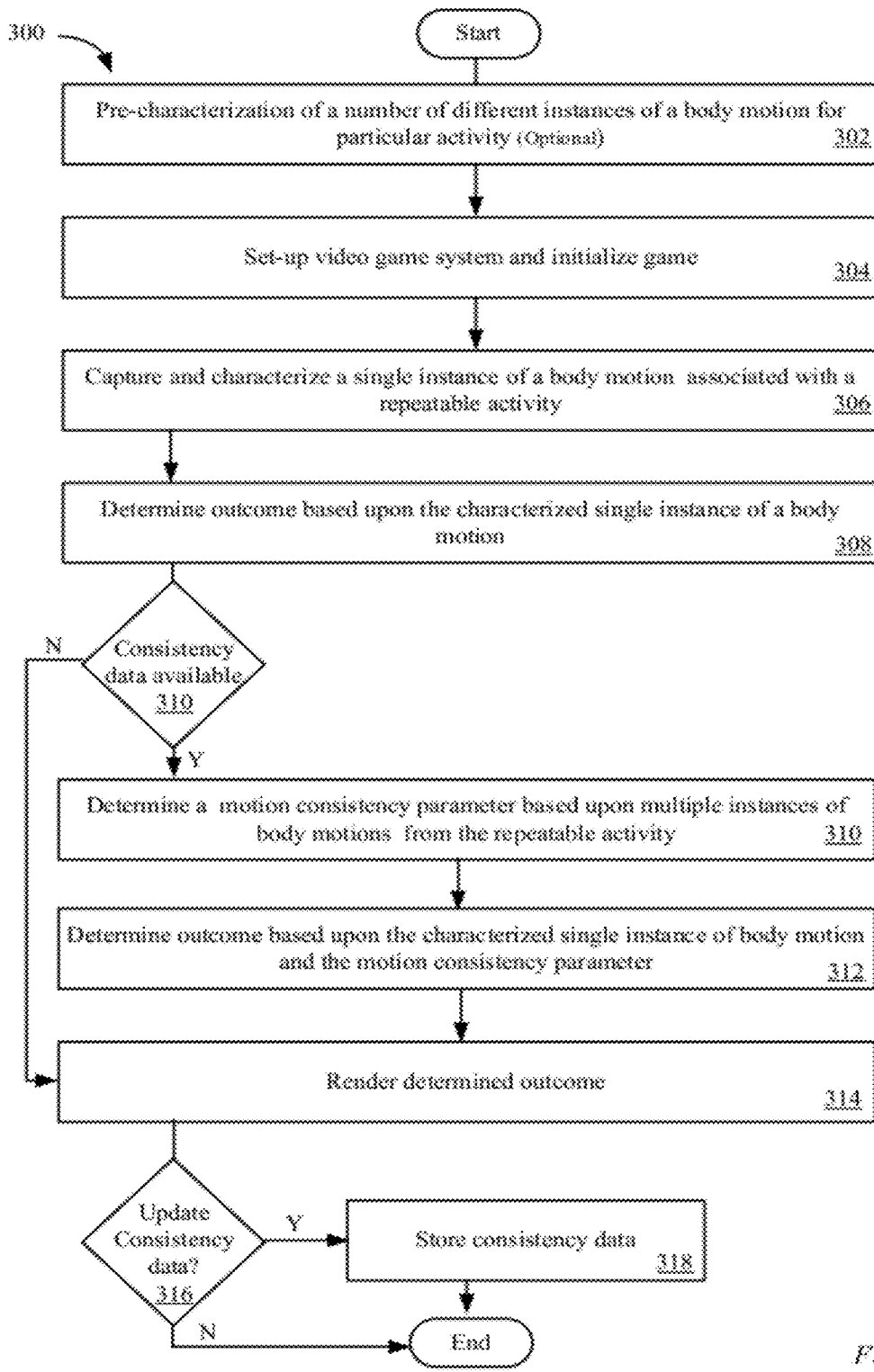
FIG. 3 is flow chart of a method for determining an outcome for a video game in accordance with an embodiment of the present invention.

FIG. 2 is a plot showing combinations of release velocity and release angle that result in a made or a missed free throw based upon computer simulations of free throws. The free throws are assumed to travel along a trajectory that is perpendicular to the backboard and bisects the hoop, i.e., there are no side to side errors. The release angle represents an angle at which the ball is released from a shooter's hand. The release velocity is related to an amount of force with which the basketball is shot. Six bands, 108, 110, 112, 114, 116 and 118 are shown in FIG. 3. Shots with a combination of release velocity and release angle within the bands result in a made shot. Shots with a combination of release velocity and release angle outside of the bands are missed shots.

In more detail, band 108, which is narrow, is associated with shots that hit the front of the rim and then go through hoop. Band 110 which is the widest band when the release angle is about 50 degrees is associated with swish shots, i.e., shots that pass through the hoop without hitting the rim. Band 112 and 114 represent shots that hit the back of the rim and go in. Band 116, which is the second largest band, is associated with bank shots that swish after hitting the backboard. Finally, band 118 represents shots that hit the backboard, the front of the rim and then goes through the hoop.

A few examples of shot trajectories and their corresponding release angle and release velocity are shown. Trajectory 102 represents a made swish shot. Trajectory 106 represents a made bank shot that hits the backboard and swishes through the hoop. Trajectory 104 represents a missed shot where the basketball travels over the backboard.

Most games of skill like basketball are designed to be sensitive to small changes in body motion. For example, a small change in the release direction and force can result in a made or missed shot. When utilizing motion capture capabilities available with current video gaming systems, a force and a direction that might be imparted on an object as a result a body motion can be estimated with some level of precision. Typically, the precision level of the estimation is isn't great enough to precisely predict an outcome. For example, a person can pretend to shoot a basketball and the force that would be imparted to an actual basketball and the trajectory of the basketball after the force is imparted can be estimated. However, the error levels in the estimation may be too large to predict with certainty whether the shot is made or missed.

As an example, in FIG. 2, an error ellipse 120 that accounts for errors in release angle and the release velocity that might be estimated from motion capture data from a motion capture sensor associated with a commercial video gaming system is shown. The error ellipse is centered about trajectory 102 which is swish shot. Within the error ellipse are large number of outcomes are possible that can be represented by different trajectories. The possible outcomes within the error ellipse include 1) missed shots, 2) shots that hit the front of the rim and go in, 3) shots that swish and 4) shots that hit the back of the rim and shots that hit the back board and go in. Graphically, the probability of a shot being made is the area of the error ellipse associated with made shots divided by the total area of the error ellipse.

In a particular embodiment, to determine whether a force and direction estimated from motion capture data results in a particular outcome, a probabilistic approach can be utilized. In the probabilistic approach for a given force and direction estimated from the motion capture data, probabilities can be determined for each of two or more possible outcomes that can result from the body motion that is captured. Then, a random number can be generated to select one of the possible outcomes based upon the determined probabilities. For example, for a person pretending to shoot a basketball, a first probability can be determined for whether the shot is made and a second probability can be determined for the shot being missed. As another example, for a golf game, a first probability can be determined for whether a shot lands in the fairway, a second probability can be determined for whether the shot lands in the rough and a third probability can be determined for whether the shot lands in a hazard, such as a bunker or water.

As described above, the probability of a desirable outcome can be increased for a single instance of a body motion based upon a measure of consistency of the body motions that the individual has previously made. Using the basketball example, a probability of a shot being made can be affected by a measure of a consistency of the individual's shooting motions for a number of previous shots. As an example, the probability of a made shot can be increased as a value of the consistency score (see FIGS. 1A and 1B) is increased. As previously described, it was observed that the consistency score increases as the skill level of the shooter increases. Using the golf example, the probability of the ball coming to rest in the fairway can be increased when an individual is more consistently able to repeat the swinging motion.

A more detailed example of this probability formulation is described as follows with respect to basketball. Similar formulations can be defined for predicting outcomes involving body motions associated with other sporting and non sporting activities. Thus, the basketball example is provided for the purposes of illustration only and is not meant to be limiting.

First, based upon a person pretending to shoot a basketball a force including its magnitude and direction can be estimated that would be imparted to the basketball if the person where actually shooting the basketball. The estimated force can be derived from the captured shooting motion data. Based upon the estimated force, a closest distance of the ball to backboard or the hoop along its trajectory can be estimated. In one embodiment, a shooting motion which predicts that the basketball doesn't come within a first threshold distance from the backboard or rim, such as twenty feet from the rim or backboard, may not be considered a shot and thus may not presented to the player with a parabolic ball flight when the results of the shot are rendered in the video game. Shots predicted from body motions of this type have zero probability of scoring.

Some of these types of shots can be identified by ranges specified for magnitude and direction of the estimated force. For example, angles ranges can be specified that define invalid shots. The range might include shots that appear to be shot straight up, directly into the ground or even backwards. When one of these shots is identified based upon a comparison to the ranges, the video game may render a non-shooting outcome rather than a shooting outcome. For example, the video gaming system might display a turnover, such as the ball being thrown out of bounds, stolen or blocked or some other non-desirable outcome.

Body motions that predict a simulated basketball is to come within a range, such as between five and twenty feet, of the rim or backboard may be considered a shot. The shot may be presented to the player with a parabolic ball flight which misses the backboard and rim. These shots also have a zero probability of scoring.

Body motions that predict a simulated basketball is to come within a range of the backboard or rim, such as within five feet may be considered a shot and can be presented to the player with a parabolic ball flight. The shot can be given some probability of being a made shot. In this example, the shot is given a 60% probability of scoring.

A determination of whether the shot is made or not can be generated using a random number. For instance, a random number between 0 and 1 can be selected. If the generated number is less than or equal to 0.6, the shot is considered made. If the generated random number is greater than or equal to 0.6, the shot is considered missed.

For a made shot, the ball flight that is presented can be mostly consistent with the direction of the force and the magnitude of the force as originally estimated from the player's natural motion. However, the ball flight may be modified slightly to align with a variety of made shots possibilities, such a swish, a rim in or a bank in. For a missed shot, the ball flight presented may be largely consistent with the estimation of the direction of the force and the magnitude of the force as originally predicted from the player's natural motion. However, the ball flight may be modified slightly to align with a variety of missed shots possibilities, such as off the rim, in and out or an air ball.

The method above provides an example of a baseline calculation that can be utilized when a measure of the consistency of the individuals shooting motion is not available. For example, the video gaming system may be configured to generate a new motion consistency parameter the first time a person starts playing and then may also be configured to allow a user to reset the motion consistency parameter for some time to time. For some number of shots, the system may be configured not to use a motion consistency parameter until enough data is gathered to generate the new motion consistency parameter. In one embodiment, the system may utilize a new motion consistency parameter after data from as little as two body motions associated with shots have been measured.

Next an example of outcome shot prediction is provided that accounts for a measure of motion consistency. In one embodiment, as will be described in more detail with respect to FIGS. 4A and 4B, a motion consistency parameter can be defined as an angle involving three body points. For example, an initial body angle (IBA) can be defined as an angle between a line from the individuals guide hand elbow to their shooting hand elbow and a line from the individuals guide hand elbow to the knee on their shooting hand side. The shooting hand elbow can be the person's left or right elbow depending on whether they are right handed or left handed.

Next, the individual can be asked to take i) a number of actual basketball shots, ii) a number of pretend basketball shots or iii) a combination of actual and pretend shots. The pretend shots can be without the ball. In one embodiment, a user can be asked to take and/or pretend to take about 25 shots. When the actual shots are taken, the shots can be from a particular distance, such as from the free throw line or from the three point line. Data from the body motions can be captured using a sensor associated with a video game system and/or sensors separate from the video game system. For example, data may be captured and analyzed using a NOAH™ system (Pillar Vision, Inc.) that may exported to a video game system, such as an Xbox-type system with a Kinect™ sensor from Microsoft™

As described above, the captured motion data can be analyzed to determine an initial body angle (IBA) for each of the actual shots or pretend shots. Then, a standard deviation for the IBA can be determined. Using the IBA, a shooting percentage for the individual can be generated as a function of the IBA standard deviation. For example, the shooting percentage can be generated as, $$\text{shooting percentage} = (-15 * \text{IBA standard deviation}) + 97,$$

In this example, the values in the formula were generated by measuring the IBA standard deviation and the associated shooting percentages for various individuals shooting actual shots and then correlating the formula to the empirical data. A line was used to fit the empirical data. However, in other embodiments, a more complex curve fit can be used to fit the data.

In particular embodiments, IBA can determined for shooting motions with and without the ball. The standard deviations of the IBA for shooting motions with and without the ball may be different. In one embodiment, a correction factor can be developed for the IBA standard deviation from shots without the ball before it is used in the shooting % formula above that is correlated to empirical data. For instance, when an individual's IBA standard deviation for shooting motions measured without the ball is typically 20% higher than the standard deviation for their measured shooting motions with the ball. The IBA standard deviation for shooting motions without the ball can be reduced by 80% before being applied to a formula that was correlated to match measured shooting percentages from actual shots.

As will be described in more detail with respect to FIGS. 4A and 4B, many different types measurements can be used to generate motion consistency parameters and these parameters may also be adjusted to account for standard deviation derived from motions with and without an object. For example, for golf, motion consistency parameters can be correlated to account for standard deviations derived from motions with and without a golf club. For tennis, motion consistency parameters can be correlated to account for standard deviations derived from motions with and without a tennis racket.

Returning to the basketball example, the shooting % determined via the formula [shooting %=(-15*IBA standard deviation)+97] can be used with the outcome prediction methodology described above where a fixed value of 60% was specified as the probability of the shot being made if the shooting motion indicated the shot would approach within 5 feet of the basketball hoop or backboard. The shooting percentage calculated from this formula can be used instead of the 60%.

In this example, as the IBA standard deviation decreases, i.e., the person is more consistent at repeating the shooting motion, the person's chances of the predicted outcome of the shot being a made shot increases. The system can be configured to recalculate the standard deviation used in a probability formulation, such as the IBA standard deviation used to determine a probability of making a shot, so that it changes over time. For example, the standard deviation of the shooting motion can be calculated based upon some number of the most recent shooting motions considered shots (As described above, some shooting motions may not be considered as valid shots by the system.). Thus, like in real-life, if a person gets tired and their motions become less consistent, the likelihood of the person making a shot in the video game will also decrease.

In various embodiments, standard deviations used in an outcome prediction formulation can change over time as different instances of a body's motion are captured and analyzed by the video gaming system. Further, the video gaming system may allow a person to save information associated with the determination of measures of motion consistency, such as standard deviations, so that data used in a first video gaming session can carry over into a second video gaming session. In addition, the video gaming system may be configured to allow a person to import or export data used in the determination of measures of motion consistency. For instance, import/export capabilities may allow two individuals to compete against one another in a video game where data associated with the determination of motion consistency is generated and exported from a first video gaming system and imported to second video gaming system. After the data is imported to the second system, motion consistency parameters can be generated for both individuals and a video game involving a competition between the two players can be initiated.

In one embodiment, the shooting percentage formulation that is a function of a motion consistency parameter can be used to affect the outcome resulting from the body motion that is depicted in the video game. As described above, due to the fidelity of the motion capture system, many different outcomes can be consistent with the force and the direction of the force that is estimated from an individual's body motions captured by the system. In particular embodiments, depending on the consistency of a person's body motions over many different instances, a selection of an outcome for a particular instance that is to be depicted can depend on a motion consistency parameter.

For example in a basketball video game, if a person achieves a shooting percentage above a first threshold, such as 90% or greater, based upon the consistency of their shooting motions, all of the outcomes predicted to be made shots can be depicted in the video game as swish shots or hitting the back rim and going down. For a second range of shooting percentages, such as between 90% and 70%, made shots can be depicted as a swish, a back rim and down or front rim and up. For a third range of shooting percentages, such as between 70% and 50%, made shots can be depicted as swish, back rim and down, front rim and up, and include an occasional roll around the rim. For a fourth range, such as a shooting percentage less than 50%, made shots can be depicted as swish, back rim and down, front rim and up, a roll around the rim, or an occasional bank shot.

In one embodiment, different probabilities of each of the outcomes occurring can be assigned and then selected using a random number. For example, for an individual with a shooting percentage greater than 90%, probabilities can be determined for each the outcomes of a swish shot or a shot hitting the back rim and going down occurring. Then, one of these outcomes can be selected based upon the determined probabilities. As another example, for an individual with a shooting percentage less than 50%, probabilities can be determined for each of a swish shot, a back rim and down shot, a front rim and up shot, a roll around the rim shot or a bank shot. Based upon the probabilities, one of the outcomes can be selected for the depiction of a made shot in the video game.

The system can also be configured to depict missed shots differently depending on the shooting percentage determined using a motion consistency parameter. For example in a basketball video game, for shooting percentages greater than 90% as determined by the formula described above, all missed shots can be depicted as traveling straight and hitting the front rim or the back rim during a miss. For shooting percentage between 90% and 70%, missed shots can be depicted as hitting the front rim, back rim or side rim. For shooting percentage between 70% and 50%, missed shots can be depicted as hitting a front rim, a back rim, a side rim and occasionally rolling around the rim and out. For a shooting percentage less than 50%, missed shots can be depicted as hitting a front rim, a back rim, a side rim, rolling around the rim and out, a bank off the backboard followed by a hit or miss of the rim, or an air ball.

In basketball, shots can be taken from different distances. Typically, an individual's shooting percentage decreases as a distance from the hoop increases. In various embodiments, probabilities for outcomes resulting from body motions can be adjusted to account for factors such as distance. For instance, an outcome prediction formula of shooting percentage=min [(−15*IBA standard deviation−(D−11)), 0]+97 can be used where "D" is a distance measured in feet from the basket to account for various shooting distances. The IBA is the initial body angle described above.

The outcome prediction formula in the previous paragraph may have been first correlated to actual shooting data and body motion analysis associated with shots of eleven feet. Thus, at distances of eleven feet, the shooting percentage is not affected by distance. As the distance from the basket approaches zero, the shooting percentage is increased as a result of being closer to the basket. The maximum possible shot percentage is 97%. As the distance from the basket increases, the shooting percentage including the maximum shooting percentage is reduced as result of the distance. If empirical data is available for shots from different distances where body motions have been characterized at each distance, then curve fits can be developed that account for the effects on the shooting percentage of both distance and the consistency of body motion. The curve fits can be used to determine a probability of a shot outcome as a function of motion consistency and distance from the basket in a video game.

In other types of games more than one motion can be utilized during a play of the game. For example, in a tennis video game at a first time, an individual can pretend to hit a serve, at a second time, the individual can pretend to hit a ground stroke and a third time an individual can pretend to hit an overhead shot. For each of the motions, probability formulations can be developed for predicting an outcome resulting from the motion, such as the shot being in or out. The probability formulations can vary according to a consistency with which the motion has been previously made as determined by data captured from a motion capture system.

Video Game System and Method Incorporating Motion Consistency Parameters

FIG. 3 is a flow chart of a method 300 for determining an outcome for a video game played on a video gaming system. In 302, a number of different instances of a body motion associated with a particular activity can be characterized. The characterization can involve calculating one or more different motion consistency parameters. The characterization may involve the video gaming system. For instance, the body motions may have been characterized in a previous video gaming session on the video gaming system.

In 304, the video gaming system can be set-up and a game can be initialized. The set-up of the video gaming system may involve configuring a motion capture device. In 306, a single instance of body motion associated with a repeatable activity can be captured using the motion capture system and characterized. Example of a body motion that might be captured include but are not limited to a person pretending to throw, kick, hit or launch a object, such as a ball.

In 308, an outcome resulting from a characterization of the single instance of the body motion can be predicted. In 310, the system can determine if consistency data is available. The consistency may be data related to previously made body motions that can be used to determine one or more motion consistency parameters and/or may be one or more previously determined motion consistency parameters.

When no consistency data is available, in 314, the outcome determined in 308 can rendered. As described above, an outcome can be depicted in a number of different ways. Thus, the system can be configured to select a depiction of an outcome to render. The depicted outcome can be output to a display as a video animation.

In 310, when consistency data is available, a motion consistency parameter can be determined. The motion consistency parameter can characterize the consistency with which a number of different instances of the body motion were made. The number of different instances of the body motion and the single instance of the body motion captured in 306 will typically be similar to one another.

In 312, an outcome can be determined based a single instance of the body motion and one or more motion consistence parameters. In one embodiment, probabilities of one or more outcomes can be determined where the probabilities are affected by a value of the one or more motion consistency parameters. Then, based upon the determined probabilities, a particular outcome can be determined. The determined outcome can be rendered again in 314. Again, the system can be configured to select a depiction of an outcome to render. When consistency data is available, the selection of the outcome to depict can depend on the consistency data.

In 316, a decision can be made whether to update the consistency data. For example, if the single instance is determined not to be valid for some reason, then it may not be added to the consistency data. However, if the single instance is valid, it can be added to the consistency data in 318 and used to determine one or more new consistency parameters when the next instance of the body motion is captured and characterized. When the single instance is determined not to be usable for some reason, then the consistency data may not be updated.

As described above, a characterization of the consistency of a body motion can be based upon identifying one or more different locations on the body using a motion capture system. After the locations are identified, one or more motion consistency parameters can be generated based upon data associated with the one or more points. The process of identifying points on the body and then generating a motion consistency parameter is described in more detail with respect to FIGS. 4A and 4B.

Figure 4A:
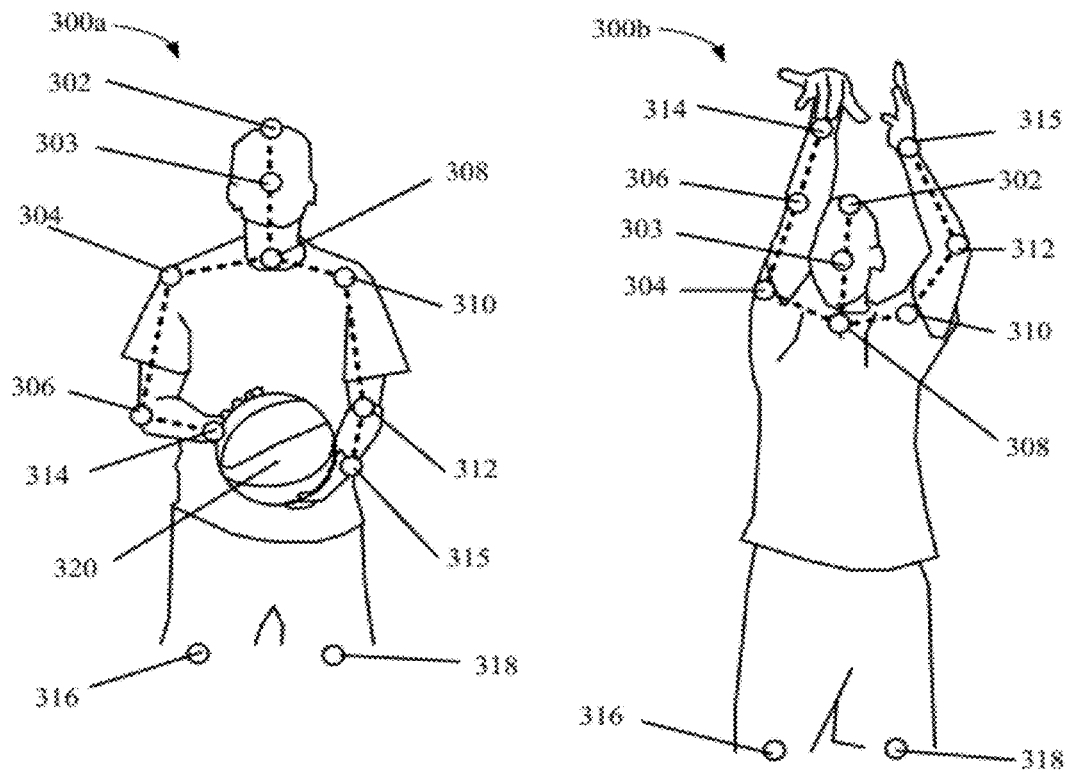
FIGS. 4A and 4B are diagrams of a basketball shooter near a beginning and end of a basketball shot in accordance with an embodiment of the present invention.
Figure 4B:
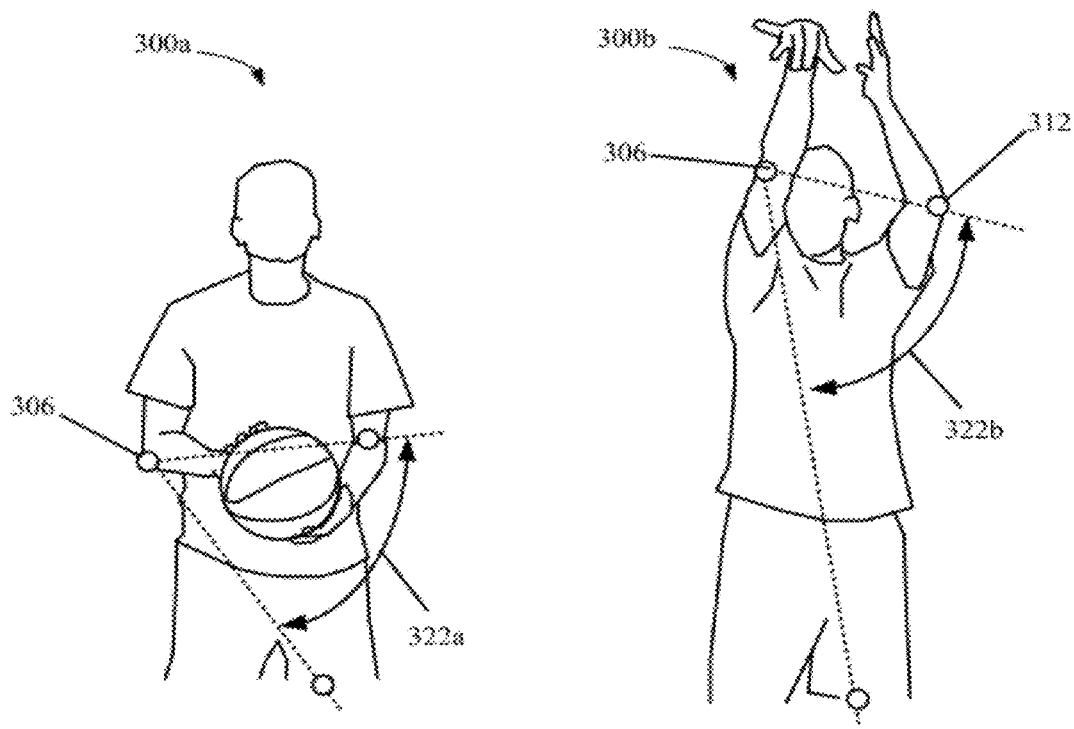

In FIG. 4A diagrams of a body of a basketball shooter near a beginning 300a and end 300b of a shooting motion associated with a basketball shot is shown. A number of locations are identified on the individual's body. These locations include a top of the head 302, the nose 303, an intersection between the neck and the body 308, where the arms attach to the body 304 and 310, elbows 306 and 312, wrists 314 and 315 and knees 316 and 318.

In 300a, the individual is shown holding a basketball 320. In 300b, the individual has performed a shooting motion and released the basketball 320. As described above, an individual may make a motion where they are pretending to perform an activity, such as shooting a basketball. When pretending to shoot a basketball, the individual might place their hands in a position as if they were holding a basketball and then make their shooting motion without actually holding a basketball.

With a video game system, it may be desirable for the individual to pretend to make a motion, such as a motion involving hitting or launching an object, because they may be in an environment where hitting or launching an actual object would cause damage. For example, if an individual is playing a video game in their living room, shooting a real basketball would likely be destructive. However, it may still be possible to utilize objects with the system that embody some aspect of an actual object that might be used during an activity but have less potential for destruction.

As an example, the basketball 320 might be an object that it is the same size of an actual basketball but much lighter and/or softer. Thus, the individual may be able to make the motion of shooting a basketball towards a basket while holding the object and even let go of the object without causing damage. For basketball, the use of the lighter but basketball-sized object can help the person to maintain the same body orientation as if they were shooting an actual basketball, such as the correct spacing between the hands that occurs when an individual holds a basketball. Thus, it may be easier to generate a pretend shooting motion that is closer to the shooting motion that is generated when a person is actually shooting a basketball.

In another example, for a golf game, an individual might use a handle that is about the same size as a golf club grip. The handle can be light, such that if the individual accidently releases it, it will not cause damage. The use of the handle allows the individual to place their hands in correct grip position for a golf swing which may make easier to imitate the body motion of swinging of an actual golf club.

Different algorithms exist for identifying body parts and identifying the linkages between the body parts from image data and then mapping the body parts to a skeletal system. The skeletal system may be a simple stick figure that joins various identified parts at the identified linkages. The system can then track the motions of the different parts as they move according to the identified linkages and adjust the skeletal system accordingly.

The Kinect™ sensor uses an infrared light to generate a depth map that can be associated with the image data. Using the depth map, one or more individuals can be distinctly identified in the image from among other objects in the image. Further, non-human objects can be identified, such as the ball shown in FIG. 4A. After an individual is identified the system looks for any shapes that appear to be a human body (a head, torso, and two legs and arms), and then starts calculating things like how those arms and legs are moving, where they can move (arms don't fold backwards at the elbow, for example), and where they'll be in a few microseconds. The identified locations can be mapped to a skeletal system.

During a motion associated with an activity, such as a shooting motion for basketball, the orientation of the different body locations change relative to one another during the motion. For example, in FIG. 4A, at the beginning of a typical shot as shown 300a, the individual's wrists, 314 and 315, and elbows 306 and 312, are below the persons shoulders and near the end of the shot as shown in 300b, the individual's wrists and elbows are above the person's shoulders.

Using the identified body locations determined from the sensor system and knowledge about a particular body motion that is expected to be repeated, one or more different orientations of the body locations can be defined that tend to occur each time the motion is repeated. The system can be configured to determine when one of the defined orientations has occurred.

As an example, for a shooting motion, a defined body orientation can be the instance when one of the hands first reaches the top of the persons head during a shooting motion. Thus, the body orientation is detected based upon a specific relationship between a location on the hand and a location at the top of the head. In another example, for a shooting motion, the angle between the forearm and the upper arm can be tracked, i.e., the angle between the body segment including points 304 and 306 and the body segment between points 306 and 314. In 300a, this angle is about ninety degrees. In 300b, this angle is about 180 degrees which corresponds to the arm extending to a straight position. The system can be configured to determine when a particular value of the angle, such as 150 degrees, occurs. In this example, a specific relationship is specified between three locations on the body.

In general, a specific relationship between two or more locations on the body can be used to determine when a particular point in a motion occurs. The specific relationship can be defined such that it will occur in each instance of the motion. For example, in the shooting motion, the specific relationship might be a location on a person's hand crossing another location on the body, such as on their chin or the top of their head. In one embodiment, when this relationship is not detected, the motion may not be used for the purposes of generating consistency data. For instance, in a shooting motion, if a location on a player's shooting hand is never detected to rise above their chest, then the shot may not be used for the purposes of generating a motion consistency parameter.

The system may be configured not to look for the angle until it determines a shooting motion has been initiated. The initiation of the shooting motion might be defined as the hands moving upwards over some distance or for some amount of time. Using this check, the system may ignore the situation where the player is merely extending their arms, such as when a ball is held below their waist. In general, the system can include logic for determining when a particular motion that is to be tracked has started.

When a specified orientation of the body is detected, the system can be configured to generate data that can be used to generate a motion consistency parameter. For example, in FIG. 4B, an angle 322a between three body points for a first body orientation is shown. The apex of the angle is at body location 306. The system can be configured to determine this angle each time a specified orientation of the body is detected during a shooting motion. A motion consistency parameter can be determined based upon the variation of this angle over multiple shooting motions. As described, in one embodiment, the variation can be quantified by determining a standard deviation.

In general, any three body points can be selected to define an angle. Further, multiple angles can be defined that utilize more than the three points. Thus, the example of angle 322a is for the purposes of illustration only and is not meant to be limiting.

As another example, the distance between two points can be measured each time a specific body orientation is detected. For instance, the distance between points 306 and 312 can be determined each time the orientation in 300b is detected. Based upon this distance and data generated from multiple instances of a captured shooing motion, a motion consistency parameter can be generated. Again, any two points can be selected to determine a distance that can be used in a motion consistency parameter and the example of points 306 and 312 is for illustrative purposes only.

In yet another example, a position of a single point may be determined at a specific time in a motion, such as when a specific body orientation is detected during the motion. For example, in 300b, the position of location 306 can be determined. The position can be determined over many instances of the motion and then used to generate a motion consistency parameter.

The system can be configured to detect when multiple body orientations occur during a motion, such as the shooting motion. Each time one of the body orientations occur, the system can be configured to generate consistency data that can be used to determine a motion consistency parameter. For example, when the body orientation in 300a is detected, angle 322a can be determined and when the body orientation in 300b is detected angle 322b can be determined. The angles 322a and 322b, which can be determined over multiple shooting motions, can be used to determine one or more motion consistency parameters. For instance, standard deviations can be determined for each of angles 322a and 322b and then a single motion consistency parameter can be generated that includes both of these standard deviations.

When consistency data is generated at two or more times during a motion, then motion consistency parameters can be generated that involve determining changes between the measurements at the different times. For example, angle 322a and angle 322b can be determined at different times during a shooting motion. Then, the difference between the angles can be determined. A motion consistency parameter can be generated that is based upon the difference between the two angles.

In another embodiment, a time associated with a body motion can be determined. For example, the system can be configured to identify when the body orientation in 300a occurs and then to identify when the body orientation in 300b occurs during a shooting motion. Amount of time that occurs between the detection of the two body orientations can be determined. Then, each time the shooting motion is repeated, an amount of time between these two body orientations can be determined. Based upon the amount of time determined over many instances of the motion, a motion consistency parameter can be determined. This type of parameter might be useful in a sport such as golf to characterize a consistency of an aspect of their swing, such as the back swing.

As described above, the body motions can be used to estimate a force that can be imparted to an object. As an example, a position of the wrist 314 can be tracked over time during the shooting motion. In the instance where a person is not holding a basketball but is pretending to shoot ball, the changes in position of the wrist can be used to estimate a magnitude of a force and a direction that would be imparted to an actual basketball.

As another example, if a person is swinging their arms in the manner of hitting a tennis ball or a golf ball. A point or points on their wrist or arms can be tracked to determine a force and direction of the force that would be imparted through their wrist. Then, a tennis racket or a golf club can be modeled as if it were extending from the wrist to determine an amount of force that would be imparted to a hit object such as golf ball or a tennis ball.

Figure 5:
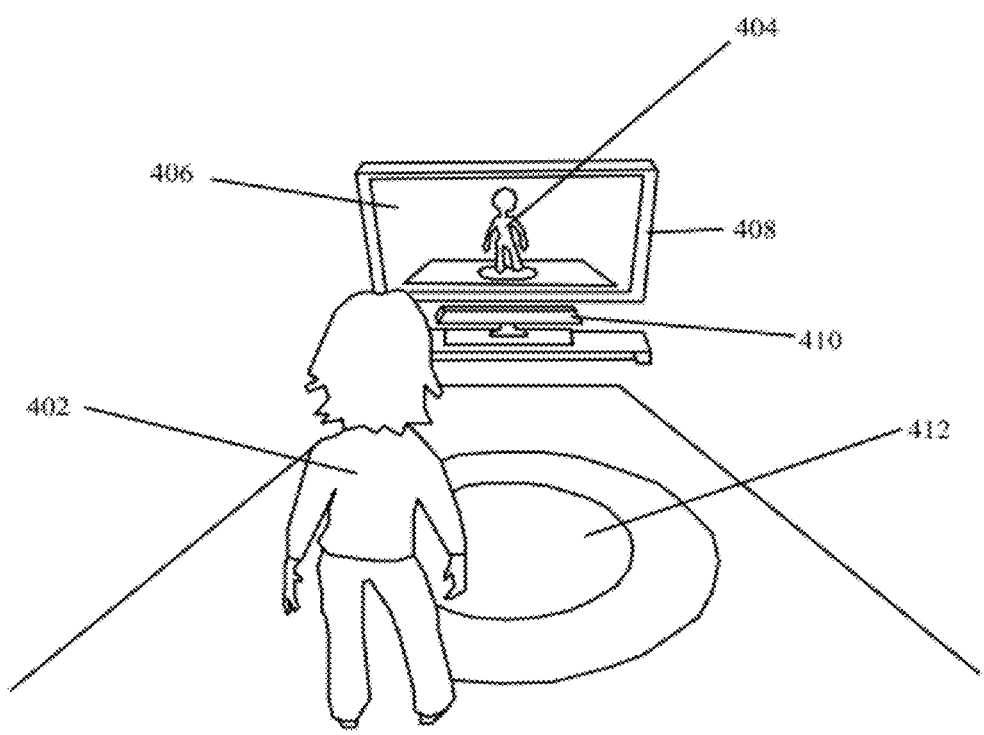
FIG. 5 is a perspective drawing of a video gaming system including a motion capture sensor in accordance with an embodiment of the present invention.

FIG. 5 is perspective drawing of video gaming system including a motion capture sensor 410. An individual is standing in front of the sensor 410. During the set-up process, the individual 402 may be directed to stand in a specific location, such as location 412.

The motion capture sensor may be capable of capturing stereoscopic images. Further, the sensor 410 may be able to emit sound or light, such as infrared light which can be bounced off the individual and detected by the sensor. In one embodiment, the sensor 410 can be a Kinect™ sensor. In another embodiment (not shown), a person can wear or hold a device that is capable of capturing motion data. A Wii™ controller by Nintendo™ or a mobile device with an accelerometer are examples of a device a player could hold or even possibly wear.

An image display device 408 including a display screen 406 is coupled to the video gaming system. An avatar 404 is output to the display screen. In one embodiment, motions captured by the sensor 410 can be used to animate the avatar 404. The avatar 404 can be animated to mimic the movements of the individual 402.

After a video game is initiated, the individual 402 may make or one or more different types of motions during the video game. For example, for a baseball game, the individual 402 may pretend to make a swinging motion associated with swinging a bat at certain times and a pitching motion associated with throwing a ball at other times. For a basketball video game, the individual 402 may make shooting motions at different times. In the video game, the shooting motions may be represented as being from different locations on a court. In a fighting video game, a person may make kicking motions, punching motions or blocking motions at different times.

Once a body motion is detected and the video gaming system determines it is a body motion for which an outcome is to be generated, the video gaming system can attempt to determine an outcome resulting from the current body motion based upon data generated from the sensor system. As described above, the outcome can be determined based upon the current instance of the body motion and based upon data derived from previous different instances where a similar body motion was generated. In one embodiment, the data derived from the previous different instances can be used to develop a measure of how consistent the individual makes the motion. A value for the measure can affect a probability of a desirable or non-desirable outcome occurring during the video game.

After the outcome for the current instance is determined, a representation of the outcome can be rendered to the display 406. The representation can involve the avatar 404 mimicking to some degree the motions of the individual 402 and performing an action that the individual is pretending to do. For instance, the individual 404 may be pretending to throw a baseball while the avatar 404 can be shown throwing a baseball. If the individual is pretending to pitch, the avatar 404 may be shown throwing a ball or strike.

Figure 6:
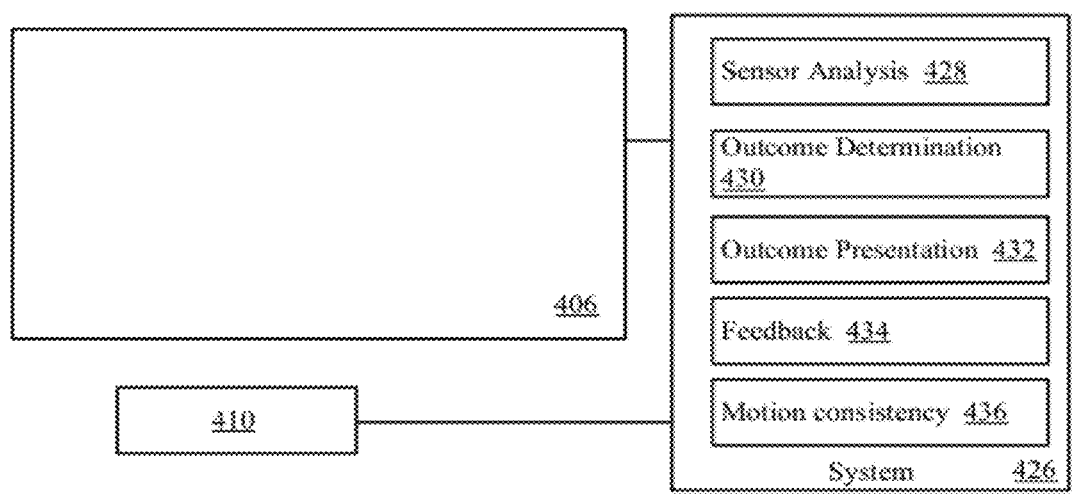
FIG. 6 is a block diagram of a video gaming system configured to predict outcomes using motion consistency parameters in accordance with an embodiment of the present invention.

FIG. 6 is a block diagram of video gaming system 426 coupled to a motion capture sensor 410 and a video display 406. The video gaming system 426 is configured to predict outcomes using motion consistency parameters. The video gaming system 426 can include a processor, memory and communication interfaces, such as a network interface.

The system 426 can include logic 428 for analyzing data received from sensor 410, such as logic for identifying and tracking various body locations on an individual during a motion used to play the game, determining the motion has been initiated, determining a particular point in the motion has occurred, determining a direction and a force associated with the body motion and determining data that can be used to generate motion consistency parameter.

The system 426 can include logic for determining an outcome 430 resulting from a motion captured by the system. The outcome can be a desirable or a non-desirable outcome. The probability of one or more of the outcomes occurring can depend on a motion consistency parameter. The system can be configured to determine probability values and then based upon the probabilities select an outcome. The outcome can be selected using a randomly generated number. The system can include logic 432 for rendering a selected outcome. The selected outcome can be shown on a video display, such as 406.

The system 426 can include logic 434 for generating feedback associated with a captured body motion. The feedback can include information that helps an individual to improve a body motion. For example, if the individual is repeatedly making a shooting motion and the system determines the person elbow position is not consistent, the system can provide feedback that allows the user to focus on their elbow position and improve the consistency of their body motion as related to the elbow position.

The system 426 can include logic 436 for generating motion consistency parameters. The generation of the parameters may include determining whether a particular instance of a body motion is to be used for the purposes of generating a motion consistency parameter. For instance, if a particular motion is determined to be invalid, then the system may not use it in the determination of motion consistency parameter. The system 426 can also be configured to reset motion consistency parameters such that its determination is based on more recently captured motion data. Further, the system can be configured to generate a new motion consistency parameter each time a valid body motion is captured.

The various aspects, embodiments, implementations or features of the described embodiments can be used separately or in any combination. Various aspects of the described embodiments can be implemented by software, hardware or a combination of hardware and software. The computer readable medium is any data storage device that can store data which can thereafter be read by a computer system. Examples of the computer readable medium include read-only memory, random-access memory, CD-ROMs, DVDs, magnetic tape and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments.

The invention claimed is:

1. A method in a video gaming system including a processor, a memory and a sensor system for capturing body motion associated with a person pretending to hit or launch an object, the method comprising:
    receiving in the processor a motion consistency parameter wherein the motion consistency parameter is generated from data captured during a plurality of different instances of the person attempting to repeat a body motion and wherein a determining of the motion consistency parameter includes determining a position of at least one point on a body of the person during each of the plurality of different instances of the body motion and determining a standard deviation using the determined positions;
    capturing via the sensor system data of a single instance of the person attempting to repeat the body motion while pretending to hit or launch the object;
    based upon the data from the single instance, in the processor, predicting a magnitude of a force and a direction of the force that would be imparted to the object if it was actually hit or launched wherein physical properties of the object including its size and mass are simulated;
    based upon the predicted magnitude of the force and the predicted direction of the force, determining in the processor whether a desired outcome for a simulated object having the mass and the size properties is possible;
    when the desired outcome is determined to be possible, determining in the processor whether the desired outcome or a non-desired outcome has occurred wherein a probability of the desired outcome occurring increases as the standard deviation associated with the motion consistency parameter decreases; and
    rendering in the processor to a display a simulated trajectory of the simulated object for the single instance, wherein the rendered simulated trajectory shows the determined desired outcome or the determined non-desired outcome occurring for the simulated object.

2. The method of claim 1, further comprising determining whether the predicted magnitude of the estimated force and the predicted direction of the force are within acceptable ranges for a valid body motion associated with the person pretending to hit or launch the object;
    when the predicted magnitude of the estimated for and the predicted direction of the force are not within the acceptable ranges the valid body motion, determining the desired outcome is not possible and rendering in the processor to the display a non-desired outcome associated with an non-valid body motion.

3. The method of claim 1, wherein the person is pretending to shoot a basketball and wherein the desired outcome is a made shot and the non-desired outcome is a missed shot in a video game generated by the video gaming system.

4. The method of claim 1, wherein the desired outcome is the simulated object stopping within a defined area and the non-desired outcome is the simulated object stopping outside of a defined area in a video game generated by the video gaming system.

5. The method of claim 4, wherein the video game is a golf video game and the desired outcome is one of a simulated golf ball stopping in a fairway or on a green and the non-desired outcome is one of the simulated golf stopping off the fairway or off the green.

6. The method of claim 1, wherein the desired outcome is the simulated object passing through a defined area and the non-desired outcome is the simulated object passing outside of the defined area in a video game generated by the video gaming system.

7. The method of claim 6, wherein the video game is a soccer video game and wherein the defined area is a plane of the goal and wherein the desired outcome is the soccer ball passing through the plane of the goal and the non-desired outcome is the soccer ball passing outside the plane of the goal.

8. The method of claim 1, wherein the object the person is pretending to hit or launch is a ball.

9. The method of claim 8, wherein the ball is one of a basketball, tennis ball, volleyball, golf ball, baseball, soccer ball, bowling ball or a football.

10. The method of claim 1, wherein the determining of the motion consistency parameter further includes determining a position of three points on the body during each of the plurality of different instances of the body motion, determining an angle from the three points and determining the standard deviation of the angle over the plurality of different instances of the body motion.

11. The method of claim 1, further comprising determining the person has initiated the body motion.

12. The method of claim 11, further comprising after determining the body motion has been initiated, identifying a specific relationship between a first body location relative to a second body location wherein the specific relationship occurs at least once each time the body motion is made.

13. The method of claim 12, further comprising when the specific relationship is identified, generating motion consistency data based upon an orientation of the person's body approximate to the time the specific relationship is identified.

14. The method of claim 1, wherein during the plurality of different instances of the person attempting to repeat the body motion, the person is hitting or launching an actual object.

15. The method of claim 1, wherein the sensor system for capturing the body motion associated with a person includes one or more video capture devices and wherein the video gaming system is configured to identify the at least one point on the body in a video image captured from the video capture device.

16. The method of claim 1, wherein the sensor system for capturing the body motion is configured to receive data from an accelerometer coupled to the person pretending to hit or launch the object.

17. The method of claim 1, wherein the probability of the desired outcome occurring includes a first component that is determined independently of the motion consistency parameter and a second component that is determined as a function of the motion consistency parameter.

18. The method of claim 1, further comprising receiving in the processor a motion consistency parameter for a second person wherein the motion consistency parameter is generated from data captured during a plurality of different instances of the second person attempting to repeat the body motion; and generating a video game including the person and the second person.

19. The method of claim 1, further comprising determining a new motion consistency parameter using the data captured during the plurality of different instances and the data captured from the single instance, capturing, via the sensor system, data for a new single instance and determining whether the desired outcome or the non-desired outcome for the new single instance has occurred using the new motion consistency parameter.

20. The method of claim 19, when the magnitude of the estimated force and the direction of the force are determined not to be within the acceptable ranges, excluding the captured sensor system data for the single instance for use in determining a new motion consistency parameter.

21. The method of claim 1, further comprising receiving a request to reset the motion consistency parameter, capturing data from a second plurality of different instances of the person attempting to repeat the motion via the sensor system and determining a new motion consistency parameter using the captured data from the second plurality of different instances.

22. The method of claim 21, further comprising determining whether a number of the second plurality of different instances has reached a threshold value wherein the new motion consistency parameter is only used to determine whether the desired outcome or non-desired outcome has occurred after the threshold value is reached.

23. The method of claim 1, further comprising: managing the plurality of different instances of the body motion used to determine the motion consistency parameter including removing older instances from and adding new instances to the plurality of different instances.

24. The method of claim 23, wherein the older instances are only removed after a number of the plurality of different instances exceeds a threshold value or a time determined from when the older instance was generated exceeds a threshold value.

25. The method of claim 1, further comprising: receiving a request to the export the motion consistency parameter, in response to the request, exporting data associated with the motion consistency parameter and removing the data associated the plurality of different instances from the video gaming system such that it is no longer used to determine whether the desired outcome or the non-desired outcome has occurred.

26. The method of claim 1, further comprising: receiving a request to import the motion consistency parameter, in response to the request, importing data associated with the motion consistency parameter and using the imported data to determine a new motion consistency parameter.

27. The method of claim 1, further comprising selecting the simulated trajectory of the simulated object from a number of possible simulated trajectories that show the determined desired or non-desired outcome.

28. The method of claim 27, wherein the selection is determined based upon the motion consistency parameter.

29. A non-transitory computer readable medium having stored a computer program executed by a video gaming system, the non-transitory computer readable medium comprising:

computer code for receiving a motion consistency parameter wherein the motion consistency parameter is generated from data captured during a plurality of different instances of a person attempting to repeat a body motion while pretending to hit or launch an object and wherein a determining of the motion consistency parameter includes determining a position of at least one point on a body of the person during each of the plurality of different instances of the body motion and determining a standard deviation using the determined positions;

computer code for capturing, via a sensor system, data of a single instance of the person attempting to repeat the body motion while pretending to hit or launch the object;

computer code, based upon the data from the single instance, predicting a magnitude of a force and a direction of the force that would be imparted to the object if it was actually hit or launched wherein physical properties of the object including its size and mass are simulated;

computer code for, based upon the predicted magnitude of the force and the predicted direction of the force, determining in the processor whether a desired outcome for a simulated object having the mass and the size properties is possible;

computer code for, when the desired outcome is determined to be possible, determining whether the desired outcome or a non-desired outcome has occurred wherein a probability of the desired outcome occurring increases as the standard deviation associated with the motion consistency parameter decreases; and computer code for rendering to a display a simulated trajectory of the simulated object for the single instance, wherein the rendered simulated trajectory shows the determined desired outcome or the determined non-desired outcome occurring for the simulated object.

* * * * *